(12) United States Patent
Hobbs et al.

(10) Patent No.: US 7,198,392 B2
(45) Date of Patent: Apr. 3, 2007

(54) TORQUE LIMITING ADJUSTER

(75) Inventors: Darien P. Hobbs, Tinley Park, IL (US); Peter B. Brazas, Baroda, MI (US)

(73) Assignee: Illinois Tool Works Inc, Glenview, IL (US)

( * ) Notice: Subject to any disclaimer, the term of this patent is extended or adjusted under 35 U.S.C. 154(b) by 239 days.

(21) Appl. No.: 11/046,096

(22) Filed: Jan. 28, 2005

(65) Prior Publication Data

US 2005/0231967 A1   Oct. 20, 2005

Related U.S. Application Data

(60) Provisional application No. 60/557,793, filed on Mar. 30, 2004.

(51) Int. Cl.
*F21S 8/10* (2006.01)

(52) U.S. Cl. ............... 362/460; 362/515; 362/524; 362/529; 362/531; 362/421; 362/428; 362/528; 362/282; 362/322; 362/512; 362/324

(58) Field of Classification Search ........ 362/460, 362/515, 523, 524, 529, 531, 546, 371, 421, 362/428, 528, 282, 322, 512, 324
See application file for complete search history.

(56) References Cited

U.S. PATENT DOCUMENTS

| | | | |
|---|---|---|---|
| 5,355,287 A * | 10/1994 | Denley | 362/524 |
| 6,447,154 B1 | 9/2002 | Denley | 362/515 |
| 6,450,674 B2 | 9/2002 | Denley | 362/512 |
| 6,773,153 B2 | 8/2004 | Burton | |

* cited by examiner

*Primary Examiner*—Sandra O'Shea
*Assistant Examiner*—Sharon Payne
(74) *Attorney, Agent, or Firm*—Mark W. Croll; Paul F. Donovan

(57) ABSTRACT

An adjuster to be used with numerous applications including the adjusting of a headlamp reflector of a headlamp assembly includes a clutch mechanism that prevents over-driving and over-traveling of the adjuster output shaft during an overload condition. The adjuster includes generally an output shaft, drive gear, spring, and a driven gear that allow the headlamp adjuster to clutch. The driven gear is held in an engaged position with the drive gear by the spring force of the spring. In a high torque condition, such as when the output shaft encounters a high load, the driven gear will disengage from the drive gear overcoming the spring force of the spring. In this position, the headlamp adjuster will clutch, thereby preventing the over-driving and over-traveling of the output shaft.

20 Claims, 7 Drawing Sheets ously practiced in various ways. Also, it is to be understood that the phraseology and terminology used herein is for the purpose of description and should not be regarded as limiting.

TORQUE LIMITING ADJUSTER

CROSS REFERENCE TO RELATED APPLICATION

This Non-Provisional Application claims benefit to U.S. Provisional Application Ser. No. 60/557,793 filed Mar. 30, 2004.

FIELD OF THE INVENTION

The present invention relates generally to adjusters for, e.g., automobile and other vehicle headlamp assemblies, that are used to adjust the position of a reflector, and more particularly to a headlamp adjuster that includes a torque limiting mechanism that, as the headlamp reflector is adjusted, will clutch when the input shaft of the adjuster experiences high torque.

BACKGROUND OF THE INVENTION

It is known that automobiles have headlamps or headlights that are used at night or during poor visibility conditions to improve the visibility for the driver. The known headlamps include generally a headlamp housing, an outer headlamp lens, a headlamp bulb, and movable headlamp reflector. The headlamp reflector is used to direct the light beam emitted from the headlamp bulb in a desired direction. In a typical application, the headlamp reflector is mounted to the headlamp housing through the use of at least one ball-type pivot, which is typically stationary on the housing. The ball-type pivot allows the reflector to be pivotally moved and therefore pivotally adjusted. To achieve the pivoting movement of the headlamp reflector and thus the adjustment of the headlamp reflector, it is known that automobile headlamps include headlamp adjusters. The headlamp adjusters move the position or orientation of the headlamp reflector and thus aim or direct the headlamp light beam in a desired direction.

The headlamp adjusters are typically mounted to the headlamp housing and include an adjuster output shaft operatively connected to the movable reflector. In use, the linear movement of the output shaft causes pivoting movement of the reflector. To effect linear movement of the output shaft, conventional adjusters include a drive component that is geared to the adjuster output shaft. A tool may be used to cause movement of the drive component. The gearing between the drive component and output shaft translates movement from the drive component to the output shaft and also causes linear translation of the adjuster output shaft. As stated, the linear movement of the output shaft causes pivoting movement of the headlamp reflector and thus adjustment of headlamp light beam.

In some instances, the headlamp reflectors move or pivot away from a desired position due to such causes as vibration, jarring, or the vehicle being in an accident. To re-adjust the headlamp reflector back to the desired position, a mechanic uses a tool to operate the drive component of the headlamp adjuster to effect movement of the output shaft and consequently movement of the reflector to the desired position.

A known drawback with existing headlamp adjusters is that the adjusters are configured such that they do not prevent "over-travel" of the adjuster output shaft. Over-travel of the adjuster shaft can have the undesirable effect of causing breakage of the headlamp adjuster housing and/or the headlamp reflector. More particularly, the over-extension of the adjuster output shaft can damage the reflector, and over-retraction of the adjuster shaft back into the adjuster housing can cause the end of the adjuster shaft to contact an interior wall of the housing, resulting in damage or cracking to the housing. A crack in the adjuster housing can have the undesirable effect of permitting dirt and/or moisture into the housing.

The present invention is directed at overcoming these and other known drawbacks and disadvantages with existing headlamp adjusters.

SUMMARY OF THE INVENTION

The present invention is directed to an adjuster that may be used with numerous applications including the adjusting of a headlamp reflector of a headlamp assembly. The headlamp adjuster of the invention incorporates a clutch mechanism that prevents over-driving and over-traveling of the output shaft. The adjuster is preferably a torque limiting adjuster. The adjuster includes generally an output shaft, drive gear, spring, and a driven gear assembly that allow the headlamp adjuster to clutch. The driven gear assembly is coupled to the output shaft and includes a driven gear and a spring. In one embodiment of the invention, the driven gear is held in an engaged position with the drive gear by the spring force of the spring. In a high torque condition, such as when the output shaft encounters a high load, the driven gear will move away from, or disengage from, the drive gear overcoming the spring force of the spring. Once in this position, the adjuster will clutch, thereby preventing the output shaft from over-driving and/or over-traveling.

Other features and advantages of the invention will become apparent to those skilled in the art upon review of the following detailed description, claims and drawings in which like numerals are used to designate like features.

Figure 1:
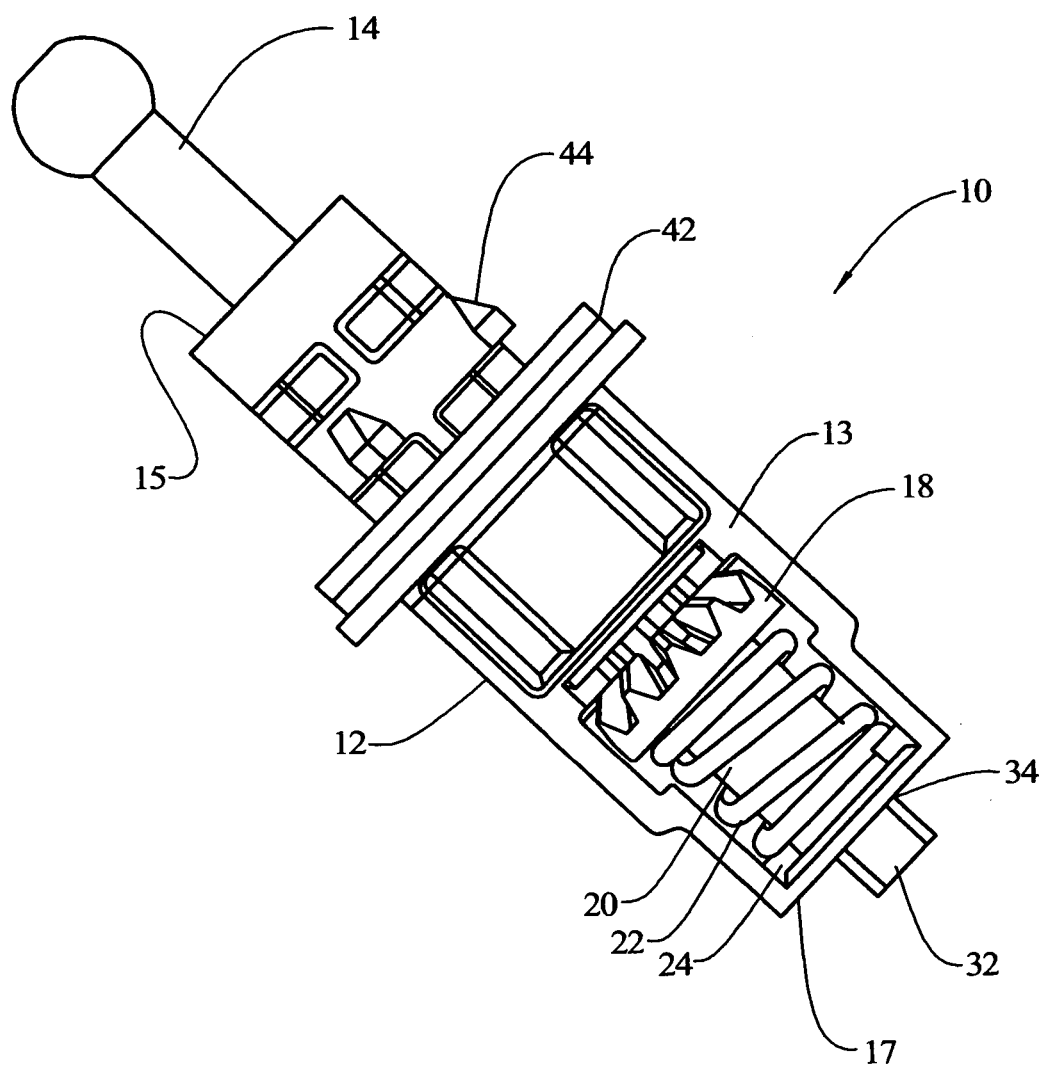
FIG. 1 is a bottom view of the adjuster assembly of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed, thereafter and equivalents thereof as well as additional items and equivalents thereof.

DETAILED DESCRIPTION OF THE EMBODIMENTS

Referring to the figures there are depicted exemplary embodiments of an adjuster assembly of the invention. The adjuster assembly may be used with numerous applications, including the adjusting of a headlamp reflector of a headlamp assembly. The adjuster assembly is torque limiting in that it limits the amount of torque that may be applied to the adjuster assembly before the adjuster assembly will clutch, thereby preventing "over-travel" of the adjuster output shaft.

In an exemplary embodiment depicted in FIGS. 1–6, the invention comprises an adjuster assembly 10 that includes a housing 12, an output shaft 14, a drive gear 16, a driven gear 18, a threaded sleeve 20, and a biasing mechanism or spring 22.

Referring to FIG. 1, the housing 12 defines a housing body 13 that is generally cylindrical in shape to contain the components of the invention. Specifically, the output shaft 14, drive gear 16, driven gear 18, threaded sleeve 20, and spring 22 are assembled relative to each other and positioned within the housing 12.

As will be appreciated by those skilled in the art, the housing body 13 may define numerous other housing body shapes and configurations depending on the application. In one embodiment, the housing body 13 may be a unitary or one-piece housing with a pocket 24 formed in the housing body 13 that permits the mounting of the spring 22. The pocket 24 is configured to also receive the driven gear 18, also called a sleeve gear, and the threaded sleeve 20. The pocket 24 is further configured to permit the driven gear 18 to slide along the threaded sleeve 20. As discussed below, the movement of the driven gear 18 on the threaded sleeve 20 allows the driven gear 18 to disengage from the drive gear 16 during a high torque condition. The housing 12 also defines lugs 44 that are located on the external surface of the housing body 13. The lugs 44 are configured to receive and mount at least one gasket 42, as described below. The housing 12 further defines an end 15 on which may seat an o-ring 40 or other similar sealing member.

Referring to FIGS. 1–4, the output shaft 14 is depicted. In operation, the output shaft 14 operatively connects to a headlamp reflector, not shown but understood by those skilled in the art. In an exemplary embodiment, the output shaft 14 may be a ball screw that includes a spherical ball head 26, a cylindrical shoulder 28 used to seal against the o-ring 40 (FIG. 2) and one or more gaskets 42, and a threaded portion 30 with flats 32. The threaded portion 30 is configured to mate with and engage internal threads in the threaded sleeve 20. The flats 32 of the threaded portion 30 are configured to engage with mating flats in a hole 34 (FIG. 1) formed in an end wall 17 of the housing 12.

Figure 5:
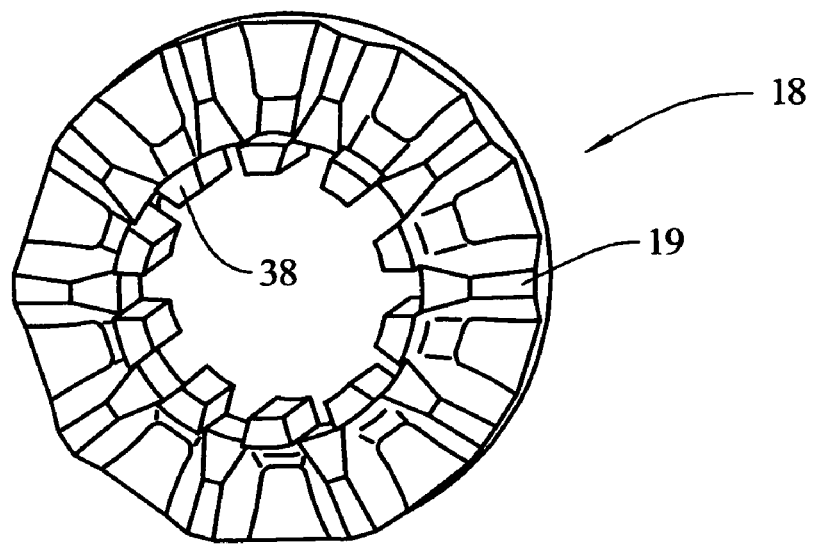
FIG. 5 is an end view of a sleeve gear for use with the adjuster assembly of the present invention.
Figure 6:
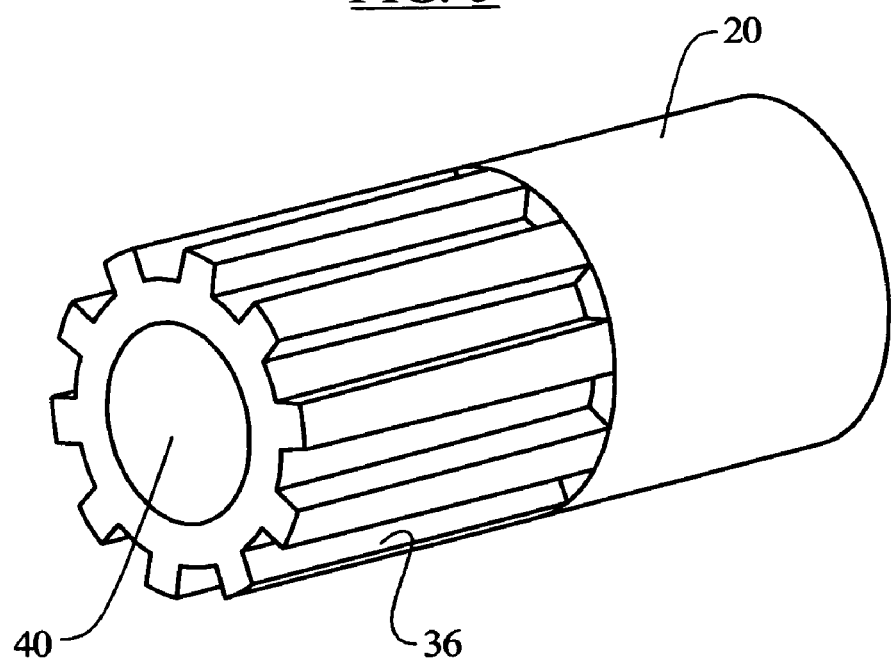
FIG. 6 is an isometric view of a threaded sleeve for use with the adjuster assembly of the present invention.

Referring to FIGS. 5 and 6, the driven gear 18, also known as a sleeve gear, may be a bevel gear having a plurality of gear teeth 19 and having an internal spline 38 that engages a mating external spline 36 of the threaded sleeve 20 to cause translation of the sleeve gear 18. The driven gear 18 may also be a driven member or any other suitable structure that will move or translate when a force or load is applied thereto.

Referring to FIG. 6, the threaded sleeve 20 defines a cylindrical body forming the external spline 36 that will mate with and engage the mating internal spline 38 formed in the driven gear 18. The external spline 36 may or may not run the entire length of the sleeve 20. The threaded sleeve 20 may include an internal thread 40 to facilitate the translation of the output shaft 14 along the axis of rotation of the driven gear 18. The internal thread 40 interacts with the threaded portion 30 of the output shaft 14. Through this interaction, the rotation of the driven gear 18 will turn or rotate the threaded sleeve 20 which will, in turn, translate the output shaft 14 in a linear manner.

Referring to FIGS. 1–4, in an exemplary embodiment, the biasing mechanism or spring 22 is a coil spring that is compressed in the assembly and seats against an internal wall of the housing 12 at housing end 17. The spring 22 also seats against the back side of the driven gear 18—the side opposite the bevel gear teeth of the driven gear 18. During normal operation, the spring 22 keeps the driven gear 18 engaged with the drive gear 16 until a high torque condition forces the driven gear 18 to slide on the threaded sleeve 20, overcoming the spring force of the spring 22, as discussed below. More specifically, under a high torque condition, the internal spline 38 of the driven gear 18 will slide along the external spline 36 of the threaded sleeve 20, thereby permitting the driven gear 18 to slide relative to the threaded sleeve 20. It should be understood that the spring 22 may be replaced by any other compressible material or object that can apply a spring-like force on the driven gear 18 and yet permit the driven gear 18 to slide relative to the threaded sleeve 20 under a high torque condition.

Figure 2:
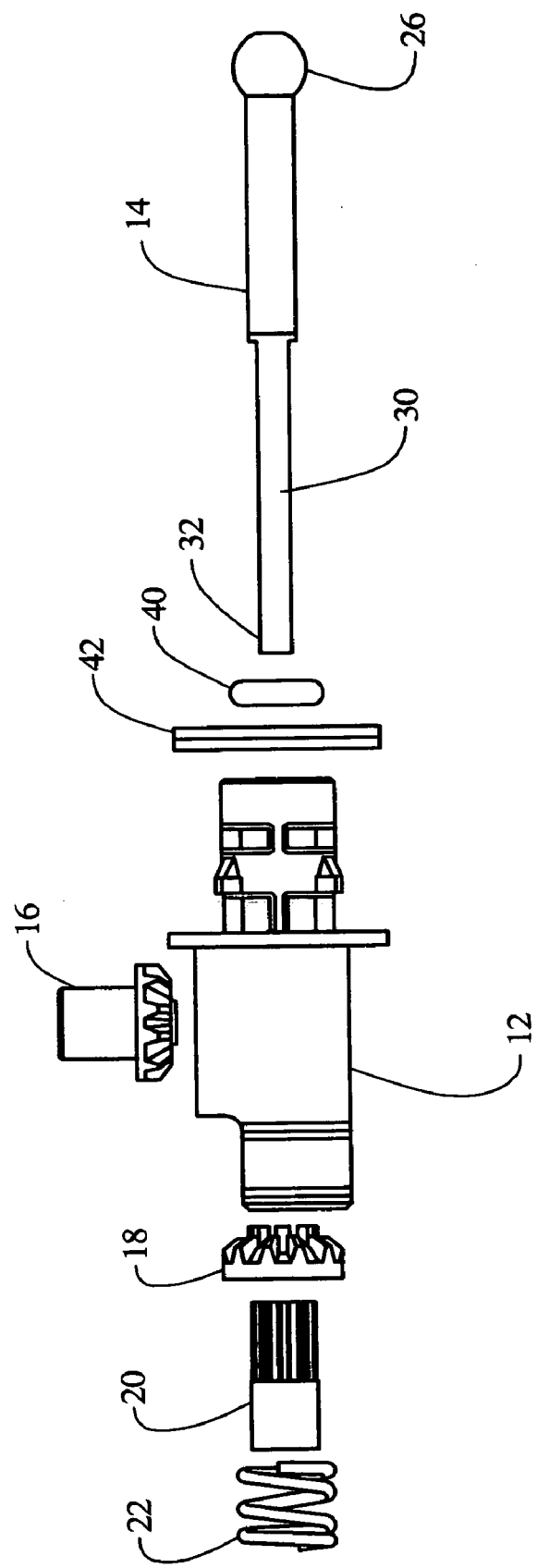
FIG. 2 is an exploded side view of the adjuster assembly of the present invention.
Figure 3:
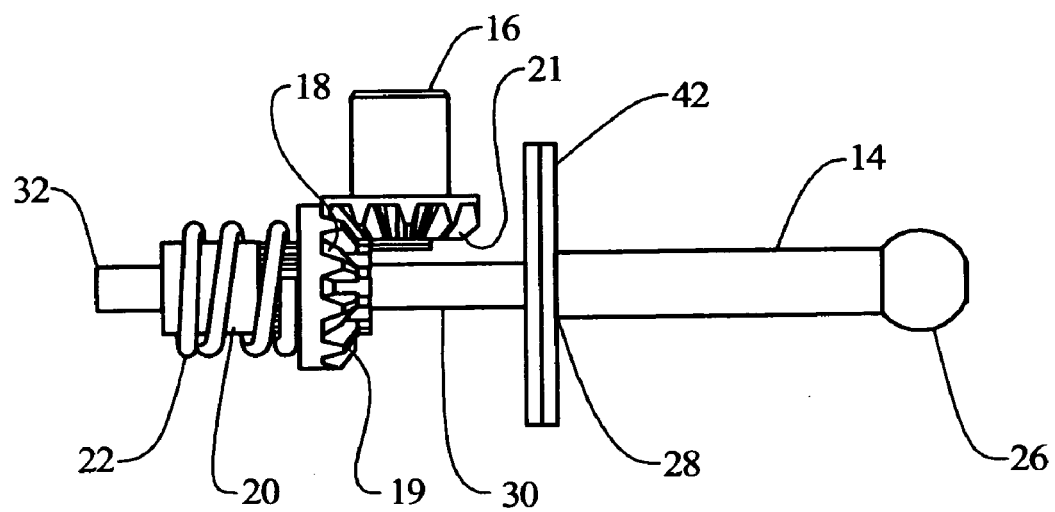
FIG. 3 is a side view of the components of the adjuster assembly of the invention.

Referring to FIGS. 2 and 3, the drive gear 16 may be a bevel gear having a plurality of gear teeth 21. The drive gear 16 may incorporate a tool interface, such as an internal or external hex configuration, an internal or external Torx configuration, or a hole, that will mate with a driving tool having a mating shape or configuration. The tool may be used to drive or cause movement of the drive gear 16, as understood in the art. In application and during normal operation, rotation of the drive gear 16 effects rotational motion to the driven gear 18 which, in turn, rotates the threaded sleeve 20 and ultimately effects linear translation of the operatively connected output shaft 14. With the present invention, the drive gear 16 may also be a drive member or any other suitable structure that causes movement of another component.

Figure 4:
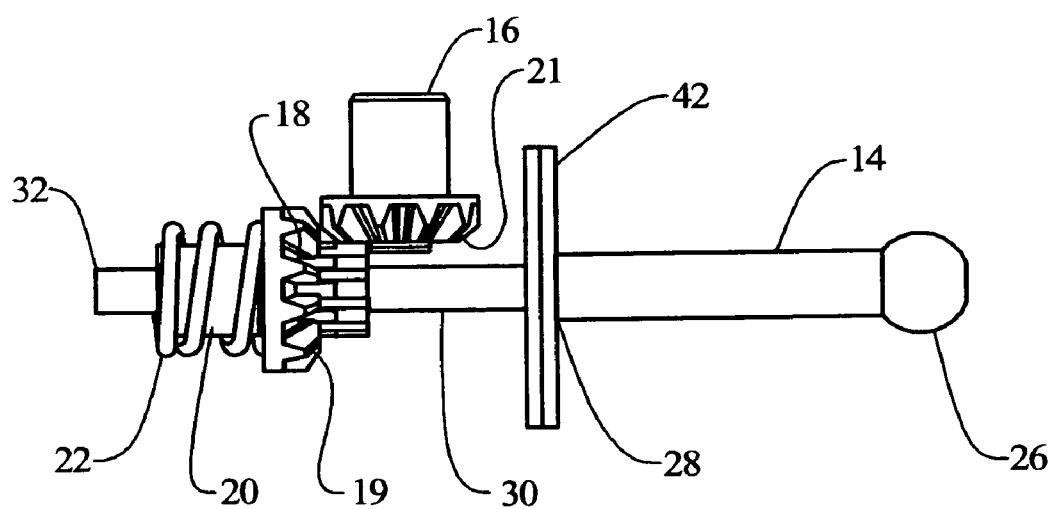
FIG. 4 is another side view of the components of the adjuster assembly of the invention illustrating how the components of the invention interact when the adjuster of the invention is clutching.

As illustrated in FIGS. 3 and 4, in operation, when the output shaft 14 is overdriven or encounters a large load, the adjuster assembly of the invention will clutch, thereby preventing the driven gear 18 and output shaft 14 from rotating and creating a high torque situation. More specifically, in a high torque condition, the bevel configuration of the drive gear 16 will force the driven gear 18 to slide on and along the external spline 36 of the threaded sleeve 20, thereby compressing the spring 22, as illustrated by FIG. 4. The driven gear 18 will continue to slide away from the drive gear 16 until the drive gear 16 is no longer engaged with the driven gear 18. At this position, the adjuster assembly will clutch and the output shaft 14 will not move linearly. The drive and driven gears will re-engage when either the high torque condition is reduced or eliminated, when the drive gear 16 is turned in the opposite direction, or when the bevel of the drive gear 16 clears the bevel of the driven gear 18, in which case the drive and driven gears will attempt to re-engage.

Referring to FIGS. 1 and 2, to assemble the invention, the drive gear 16 is inserted into the pocket 24 formed in the housing 12. The threaded sleeve 20 is then placed in the driven gear 18 and the spring 22 is placed over the threaded sleeve 20 behind the driven gear 18. The spring 22 is then compressed and placed in the pocket 24. The spring force of the spring 22 will cause this sub-assembly to stay in position within the housing 12. The o-ring 40 is seated onto the end of the housing 12 and the gasket 42 is installed over the lugs 44 formed on the external surface of the housing 12. The output shaft 14 is then inserted into the central body of the housing 12 and will engage with the internal thread 40 of the threaded sleeve 20. The internal thread 40 will interact with the thread portion 30 of the output shaft 14 when the drive gear 16 is turned. That is, as the drive gear 16 is turned, the driven gear 18 cause rotation of the threaded sleeve 20, thereby causing linear movement of the output shaft until the output shaft 14 has been driven to the desired length.

Referring to FIGS. 7–11, there is depicted another embodiment of a torque limiting adjuster assembly 70 of the invention. In this embodiment, the torque limiting element is similar to the above described element in that a driven gear 72 is held in engagement with a drive gear 74 through the use of a spring 76. In an exemplary embodiment, the gears 72, 74 are bevel gears. When the adjuster assembly 70 experiences a high-torque condition, the spring 76 is compressed, allowing the teeth of the gears 72, 74 to temporarily disengage. In this condition, the output shaft 78 will not change position, relative to the adjuster housing 80. In other words, the output shaft 78 will not extend or retract relative to the adjuster housing 80. During normal operation, the spring force of the spring 76 will cause the driven gear 72 to engage the drive gear 74, and the output shaft 78 will advance relative to the adjuster housing 80.

Figure 7:
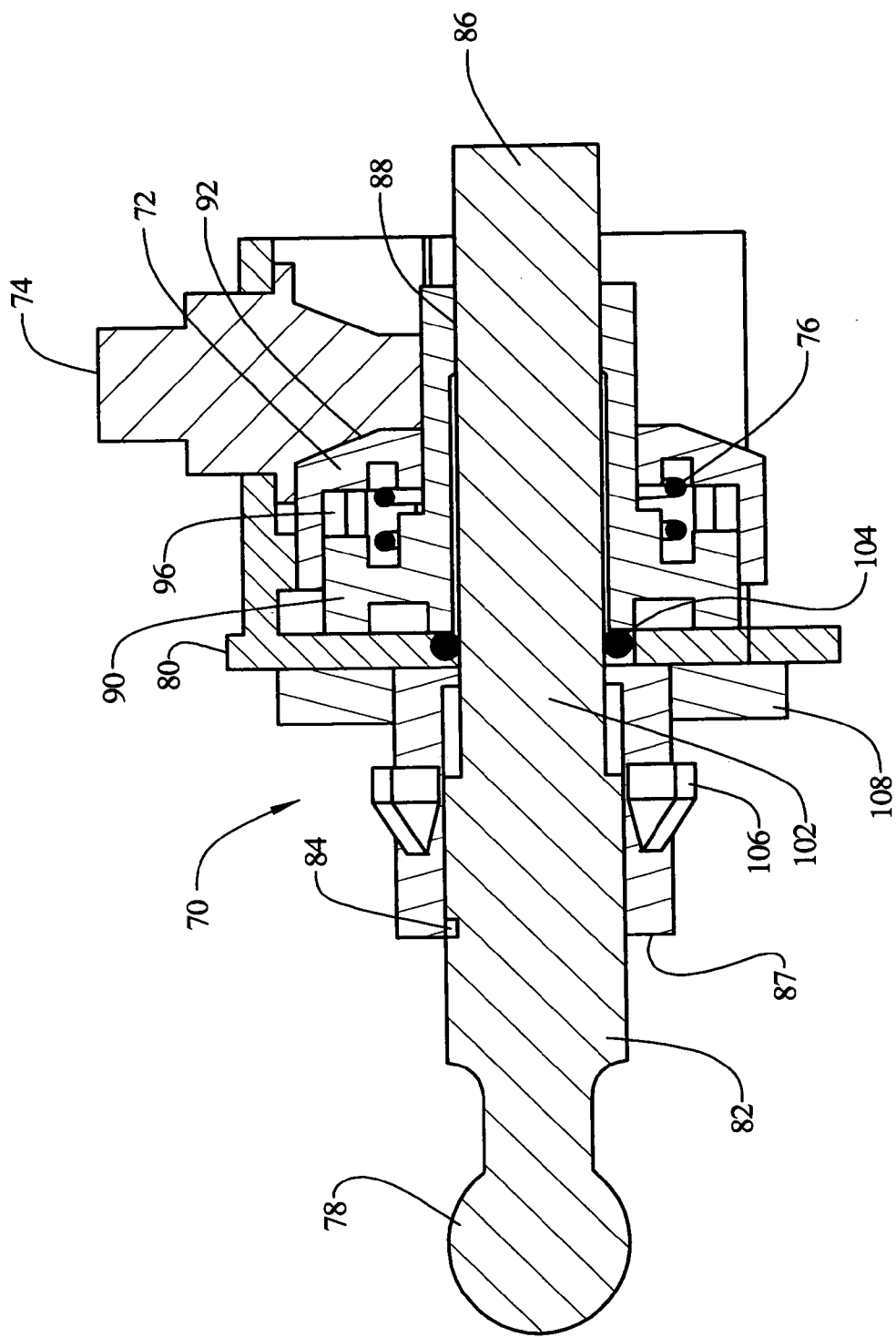
FIG. 7 is a cross-section view of an alternative embodiment of a torque limiting adjuster assembly of the present invention.
Figure 8:
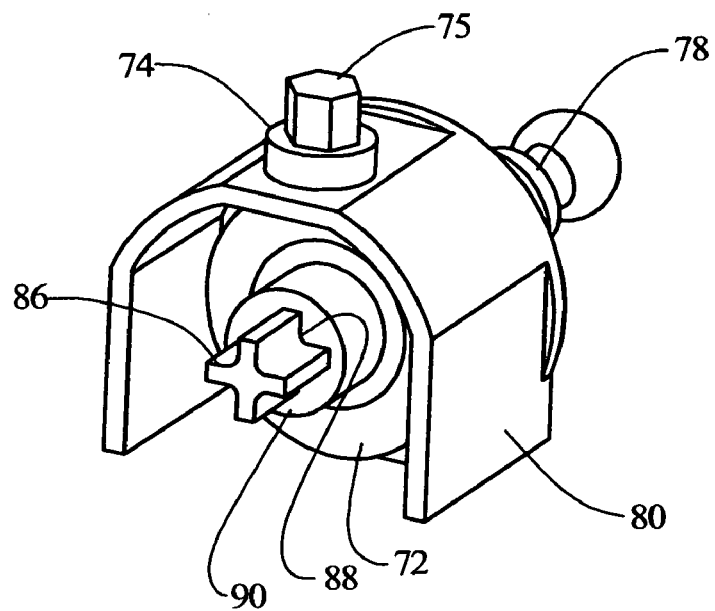
FIG. 8 is an isometric rear view of the torque limiting adjuster assembly of FIG. 7.
Figure 9:
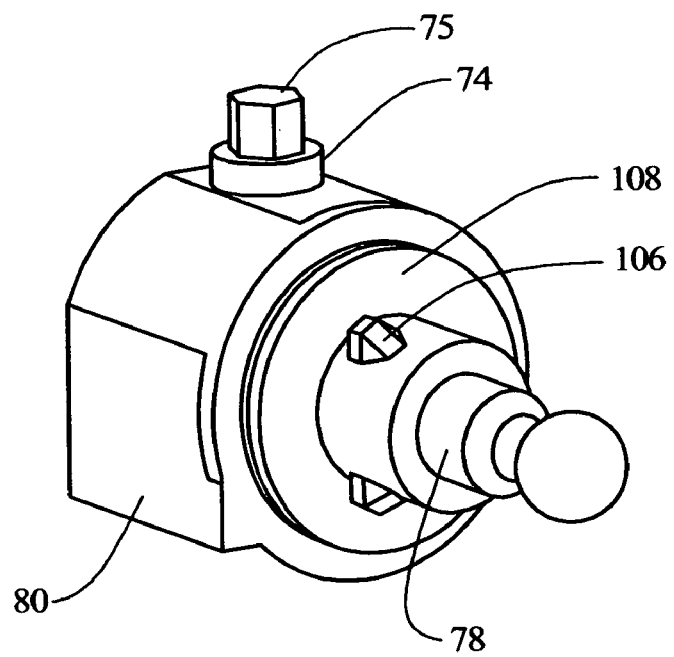
FIG. 9 is an isometric front view of the torque limiting adjuster assembly of FIG. 7.

Referring to FIG. 7, the components of the exemplary embodiment of the adjuster assembly 70 include the housing 80, the output shaft 78 having a threaded portion 82 that interacts with a thread follower 84 located at the end 87 of the housing 80. The output shaft 78 also has a cruciform portion 86 that is slidingly engaged with a mating cruciform feature 88 in a spring cup 90, as shown in FIG. 8. In operation, rotation of the spring cup 90 is translated to the output shaft 78 through the engagement of the cruciform portions 86, 88. Rotation of the output shaft 78 advances the threaded portion 82 along the thread follower 84. This relationship results in the axial translation of the output shaft 78 relative to housing 80.

Similar to the above embodiment, the output shaft 78 defines a shoulder portion 102 located between the threaded portion 82 and the cruciform portion 86 to seal against an o-ring 104. Positioned on the output shaft 78 and over lugs 106 formed on the external surface of the housing 80 is at least one gasket 108.

Similar to the above embodiment, the drive gear 74 may incorporate a tool interface, such as an external hex configuration 75 (FIG. 8), or any other internal or external tool interface configuration, that may be manipulated by a tool to cause movement of the drive gear 74. Referring to FIG. 7, upon rotation of the drive gear 74, motion is translated to the driven gear 72 through bevel gear teeth which interact with each other at contact line 92.

Figure 11:
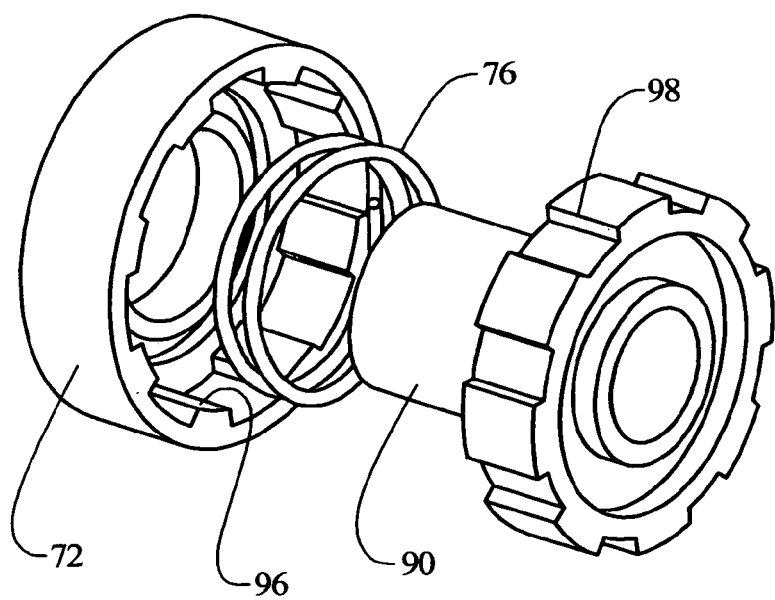
FIG. 11 is an exploded view of the components of the invention of FIG. 7.

As illustrated by FIG. 11, the driven gear 72 defines an internal spline 96 that will slidably engage with an external spline 98 formed on the spring cup 90. The spring 76 is positioned between the driven gear 72 and the spring cup 90 and will provide a spring force on the driven gear 72 to cause the driven gear 72 to engage with the drive gear 74.

Similar to the above embodiment, the spring 76 maintains engagement of the bevel gear teeth of the gears 72, 74 under normal operating torque. In a high-torque condition, the resultant axial force on the driven gear 72 will act to compress the spring 76 allowing the gear teeth of the gears 72, 74 to disengage as the driven gear 72 slides along the external spline 98 of the spring cup 90. In this condition, the adjuster assembly will clutch thereby preventing over-travel of the output shaft 78. The spring force of the spring 76 will allow the gear teeth of the gears 72, 74 to re-engage when the torque returns to a desired operating range.

Figure 10:
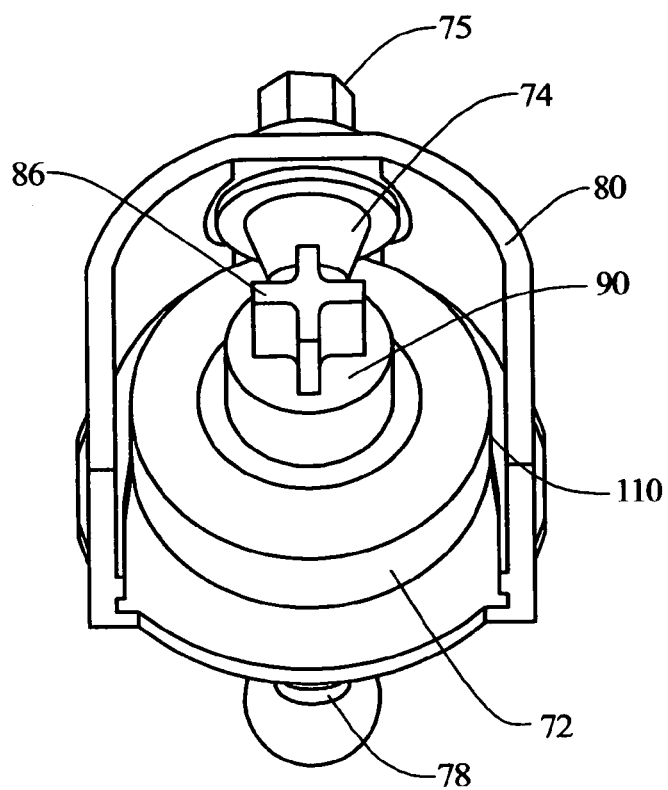
FIG. 10 is an isometric bottom view of the torque limiting adjuster assembly of FIG. 7.

As depicted in FIG. 10, the driven gear 72 may be snap-fitted to the housing 80 through an undercut snap 110 formed in the underside of the housing 80. The undercut snap 110 defines a semi-circular receptor that is sized to provide retention of the driven gear 72, spring cup 90, and spring 76 to the housing 80.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A torque limiting adjuster for adjusting a position of a reflector of a headlamp assembly comprising:
   a housing;
   an output shaft extending outward from the housing, the output shaft is operatively engageable with the reflector of the headlamp assembly;
   a clutch mechanism disposed in the housing, the clutch mechanism comprising a drive gear, a driven gear disposed on the output shaft, and a biasing mechanism for urging the driven gear onto the drive gear; and
   a threaded sleeve disposed between the driven gear and the output shaft, wherein the threaded sleeve defines a threaded interior for engagement with the output shaft, and wherein the threaded sleeve defines a splined exterior for engagement with a splined interior of the driven gear;
   whereby during an overload condition the driven gear will overcome the urging force of the biasing mechanism and move any from the drive gear, thereby preventing the output shaft from translating substantially axially.

2. The torque limiting adjuster of claim 1 wherein the biasing mechanism is a spring positioned between an interior wall of the housing and the driven gear and around the exterior of the threaded sleeve.

3. The torque limiting adjuster of claim 1 wherein the drive gear and driven gear are bevel gears.

4. The torque limiting adjuster of claim 1 wherein the drive gear defines a tool interface.

5. The torque limiting adjuster of claim 1 wherein the housing defines a pocket for receiving the drive gear, driven gear, and the biasing mechanism.

6. The torque limiting adjuster of claim 1 further comprising an o-ring and gasket disposed on the housing.

7. The torque limiting adjuster of claim 1 wherein the output shaft defines a threaded pardon, a cylindrical shoulder, and a ball head.

8. The torque limiting adjuster of claim 7 wherein the housing defines a thread follower for engagement with the threaded pardon of the output shaft, wherein the thread follower permits movement of the output shaft relative to the housing.

9. A torque limiting adjuster for adjusting a position of a reflector of a headlamp assembly comprising:
   a housing;
   an output shaft extending outward from the housing, the output shaft is operatively engageable with the reflector of the headlamp assembly;
   a clutch mechanism disposed in the housing, the clutch mechanism comprising a drive gear, a driven rear disposed on the output shaft, and a biasing mechanism for urging the driven gear onto the drive gear; and
   a spring cup disposed between the driven gear and the output shaft;
   whereby during an overload condition the driven gear will overcome the urging force of the biasing mechanism and move away from the drive gear, thereby preventing the output shaft from translating substantially axially.

10. The torque limiting adjuster of claim 9 wherein the biasing mechanism is a spring positioned between a wall of the spring cup and the driven gear and around an exterior surface of the spring cup.

11. The torque limiting adjuster of claim 10 wherein the output shaft and the spring cup define mating cruciform portions for translating movement between the spring cup and the output shaft.

12. An adjuster for adjusting a position of a vehicle component comprising:
   a housing;
   an output shaft mounted to the housing;
   a torque limiting mechanism operatively coupled to the output shaft to limit output shaft travel during a high load condition, the torque limiting mechanism comprising a drive member, a driven member operatively coupled to the output shaft, and a biasing mechanism for urging the driven member onto the drive member; and
   a treaded sleeve disposed between the driven member and the output shaft;
   wherein the biasing mechanism is a spring positioned between an interior wall of the housing and the driven member and around the threaded sleeve;
   whereby during the high load condition the driven member will move away front the drive member, thereby preventing the output shaft from moving relative to the housing.

13. The adjuster of claim 12 wherein the drive member and driven members are gears.

14. The adjuster of claim 12 wherein the housing defines a pocket for receiving the drive member, driven member, and the biasing mechanism.

15. The adjuster of claim 12 further comprising an o-ring and gasket disposed on the housing.

16. The adjuster of claim 12 wherein the output shalt defines a threaded portion, a cylindrical shoulder, and a ball head.

17. The adjuster of claim 16 wherein the housing defines a thread follower for engagement with the threaded portion of the output shaft, wherein the thread follower permits movement of the output shaft relative to the housing.

18. An adjuster for adjusting a position of a vehicle component comprising;
   a housing;
   an output shaft mounted to the housing;
   a torque limiting mechanism operatively coupled to the output shaft to limit output shaft travel during a high load condition, the torque limiting mechanism comprising a drive member, a driven member operatively coupled to the output shaft, and a biasing mechanism for urging the driven member onto the drive member; and
   a spring cup disposed between the driven member and the output shaft;
   whereby during the high load condition the driven member will move away from the drive member, thereby preventing the output shaft from moving relative to the housing.

19. The adjuster of claim 18 wherein the biasing mechanism is a spring positioned between a wall of the spring cup and the driven member and around an exterior surface of the spring cup.

20. The adjuster of claim 19 wherein the output shaft and the spring cup define mating cruciform portions for translating movement between spring cup and the output shaft.

* * * * *